United States Patent
Cook et al.

(10) Patent No.: US 10,172,280 B2
(45) Date of Patent: Jan. 8, 2019

(54) CUTTER GUARD ASSEMBLY FOR KNIFE DRIVE OF AN AGRICULTURAL FARM IMPLEMENT

(71) Applicant: CNH Industrial America LLC, New Holland, PA (US)

(72) Inventors: Joel T. Cook, Lititz, PA (US); Curtis F. Hillen, Lititz, PA (US); Andrew V. Lauwers, Stevens, PA (US); Craig D. Roberts, Denver, PA (US); Kyle R. Schropp, Mount Joy, PA (US); Joshua S. Joyce, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 358 days.

(21) Appl. No.: 14/888,227

(22) PCT Filed: Apr. 29, 2014

(86) PCT No.: PCT/US2014/035866
§ 371 (c)(1),
(2) Date: Oct. 30, 2015

(87) PCT Pub. No.: WO2014/179309
PCT Pub. Date: Nov. 6, 2014

(65) Prior Publication Data
US 2016/0066503 A1   Mar. 10, 2016

Related U.S. Application Data

(60) Provisional application No. 61/846,849, filed on Jul. 16, 2013, provisional application No. 61/834,911, (Continued)

(51) Int. Cl.
*A01D 34/30* (2006.01)
*A01D 34/18* (2006.01)
(Continued)

(52) U.S. Cl.
CPC ............. *A01D 34/18* (2013.01); *A01D 34/04* (2013.01); *A01D 34/14* (2013.01); *A01D 34/30* (2013.01); *A01D 41/14* (2013.01)

(58) Field of Classification Search
CPC ........ A01D 34/18; A01D 34/14; A01D 34/04; A01D 41/14; A01D 34/40; A01D 34/30
(Continued)

(56) References Cited

U.S. PATENT DOCUMENTS 2,515,343 A    7/1950   Gravely
3,866,400 A *  2/1975   May ....................... A01D 57/26
                                                          56/158
(Continued)

OTHER PUBLICATIONS

Search Report for Chinese Patent Application No. 201480032351.9 dated Oct. 10, 2017 (15 pages, w/ translation).

*Primary Examiner* — Thomas B Will
*Assistant Examiner* — Mai T Nguyen
(74) *Attorney, Agent, or Firm* — Peter K. Zacharias; Patrick M. Sheldrake

(57) ABSTRACT

A cutter guard assembly for a knife drive of an agricultural farm implement is provided. The cutter guard assembly includes a cutter bar assembly, a window frame, and a floor sheet. The cutter bar assembly has a cutter bar and a reciprocating knife assembly operatively connected to a knife drive. The window frame is rigidly attached to the cutter bar. The window frame includes an opening through which a knife arm of the reciprocating knife assembly extends through. The floor sheet extends rearwardly from the cutter bar and pivots relative to the window frame.

12 Claims, 15 Drawing Sheets

Related U.S. Application Data filed on Jun. 14, 2013, provisional application No. 61/818,446, filed on May 1, 2013.

(51) Int. Cl.
*A01D 34/04* (2006.01)
*A01D 34/14* (2006.01)
*A01D 41/14* (2006.01)

(58) Field of Classification Search
USPC ............... 56/158, 181, 257, 296–299, 320.1
See application file for complete search history.

(56) References Cited

U.S. PATENT DOCUMENTS

| | | | |
|---|---|---|---|
| 4,199,925 A | 4/1980 | Quick et al. | |
| 4,665,685 A * | 5/1987 | Rupprecht | A01D 41/14 56/15.8 |
| 4,707,972 A * | 11/1987 | Knepper | A01D 41/14 460/16 |
| 4,722,172 A * | 2/1988 | Pearce | A01D 34/13 56/14.4 |
| 4,891,932 A | 1/1990 | Johnson | |
| 6,070,401 A * | 6/2000 | Johnson | A01D 41/14 56/158 |
| 8,484,939 B1 * | 7/2013 | Cormier | A01D 43/06 56/158 |
| 9,814,183 B2 * | 11/2017 | Allochis | A01D 61/02 |
| 2007/0204586 A1 | 9/2007 | Coers | |
| 2009/0277146 A1 * | 11/2009 | Sauerwein | A01D 41/14 56/208 |
| 2014/0109540 A1 | 4/2014 | Cook | |
| 2014/0230398 A1 * | 8/2014 | Cook | A01D 34/14 56/298 |
| 2014/0318094 A1 | 10/2014 | Cook et al. | |
| 2014/0345239 A1 | 11/2014 | Cook et al. | |
| 2015/0000237 A1 * | 1/2015 | Ritter | A01D 34/145 56/10.1 |
| 2016/0135366 A1 * | 5/2016 | Cook | A01D 34/04 56/307 |
| 2016/0316620 A1 * | 11/2016 | Allochis | A01D 34/18 |

* cited by examiner

CUTTER GUARD ASSEMBLY FOR KNIFE DRIVE OF AN AGRICULTURAL FARM IMPLEMENT

This application is the US National Stage filing of International Application Serial No. PCT/US2014/035866, filed on Apr. 29, 2014 which claims priority to U.S. Provisional Applications with Ser. Nos. 61/818,446, filed May 1, 2013, 61/834,911, filed Jun. 14, 2013, and 61/846,849, filed Jul. 16, 2013, each of which is hereby incorporated by reference in its entirety.

BACKGROUND OF THE INVENTION

The present invention relates generally to a header of an agricultural farm implement. In particular, the present invention relates to a cutter guard assembly for a knife drive of a header for an agricultural farm implement.

Mechanical harvesting of crop and processing of crop material has taken place for decades. However, efforts continue in the attempt to make harvesting and farm processing operations more efficient and effective. This is typically accomplished with farm implements such as mechanical harvesters, a hay head, windrowers, etc. Exemplary farm implements include an agricultural combine having a header which cuts the crop. The header then moves the cut crop into a feeder house. The feeder house lifts the cut crop into the threshing, separation and cleaning areas of the agricultural combine. An operator usually runs these various operations from a glass-enclosed cab.

Certain farm implements have headers such as a draper header or windrow. Draper headers include a knife assembly and cutter bar assembly typically supported along a support extending in a widthwise direction of the combine. The knife assembly is typically oriented so as to extend sidewardly along a forward edge portion of a support structure (running in a widthwise direction of the combine) of the header. The header includes a floor sheet or pan which can define the lower periphery of a cut crop or plant flow area, and which can include a conveying apparatus, such as one or more augers or belts, operable in cooperation with a reel in machines so equipped, for conveying the cut plant material and crops, for instance, to a feeder inlet of a combine or windrow forming apparatus of a windrower.

Conventional draper headers include sickles or sickle knives having cutter bars supporting a row of knives for cutting plants, including, but not limited to, hay, grasses, small grains and the like. In general, such knives are composed of a plurality of knife or sickle sections which are mounted in side by side relation forming an elongate metal knife assembly or reciprocating assembly. The reciprocating knife assembly is normally supported so as to slide longitudinally along an elongate stationary bar that has forwardly projecting, spaced apart guards bolted to a structural beam or knife back. The knife assembly moves back and forth in a reciprocating movement to move the knives relative to the guards so that the leading knife edges of the knives cross over the guards or through slots in the guards. This produces a shearing or cutting action which severs plant stems and stalks or other material captured between the knives and the guards.

Such headers of agricultural farm implements are used for cutting and/or processing large quantities of crop material. In doing so, however, excessive amounts of material collect on the surfaces of a center mounted knife assembly, such as the knife assembly's gear box, floor sheet, flaps, and cutter bar assembly which can ultimately lead to operational failure of such components. As a result, the collection of material on these components must be intermittently cleaned out on a regular basis during operation in order to ensure proper operation of the header and prevention of mechanical failure of the header, which is a time consuming and costly process As such, a need still exists for a cutter guard assembly for a knife drive of an agricultural farm implement that addresses the foregoing issues.

BRIEF SUMMARY OF THE INVENTION

In accordance with a preferred embodiment, the present invention provides a cutter guard assembly for a knife drive of an agricultural farm implement that includes a cutter bar assembly, a window frame, and a floor sheet. The cutter guard assembly includes a cutter bar and a reciprocating knife assembly operatively connected to a knife drive. The window frame is rigidly attached to the cutter bar. A knife arm of the reciprocating knife assembly extends through an opening of the window frame. The floor sheet extends rearwardly from the cutter bar and is pivotable relative to the window frame.

In accordance with another preferred embodiment, the present invention provides a cutter guard assembly for a knife drive of an agricultural farm implement that includes a cutter bar assembly, a window frame, and a flap. The cutter bar assembly includes a cutter bar and a reciprocating knife assembly operatively connected to a knife drive. The window frame is attached to a cutter bar. The window frame includes an opening for receiving a knife arm of the reciprocating knife assembly and a slot extending from the opening. The flap is operatively connected to the knife drive for reciprocatively moving towards and away from the slot.

BRIEF DESCRIPTION OF THE SEVERAL VIEWS OF THE DRAWINGS

The foregoing summary, as well as the following detailed description of the preferred embodiments of the invention will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to preferred embodiments of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The disclosures of U.S. provisional application Nos. 61/818,446; 61/834,911; and 61/846,849 are hereby incorporated by reference in their entirety.

The terms "crop," and "crop material" are used throughout the specification for convenience and it should be understood that these terms are not intended to be limiting. Thus, "grain" and "crop" refer to that part of crop material which is harvested and separated from discardable portions of crop material.

Figure 1:
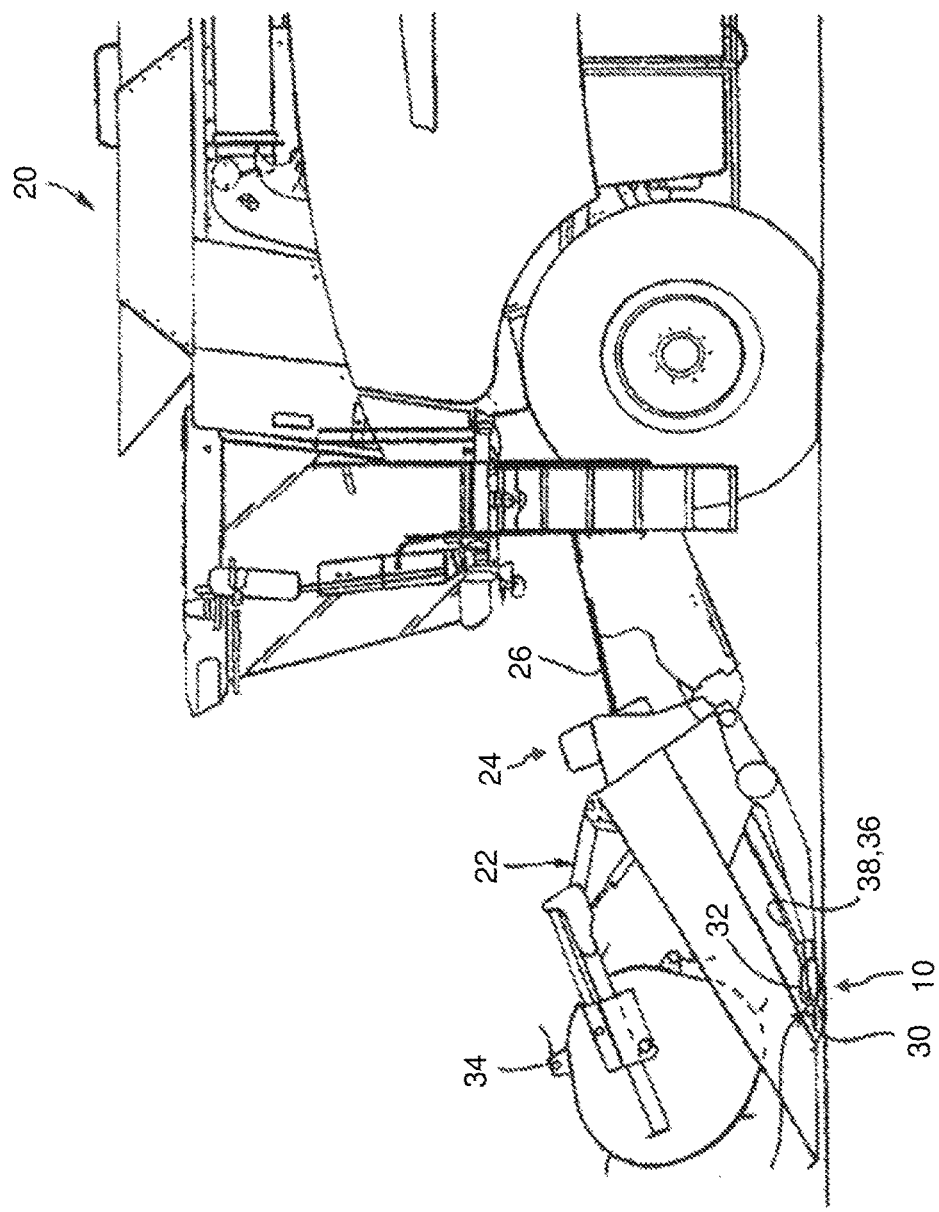
FIG. 1 is a left side elevation view of a cutter guard assembly in accordance with a preferred embodiment of the present invention attached to an agricultural combine.
Figure 2:
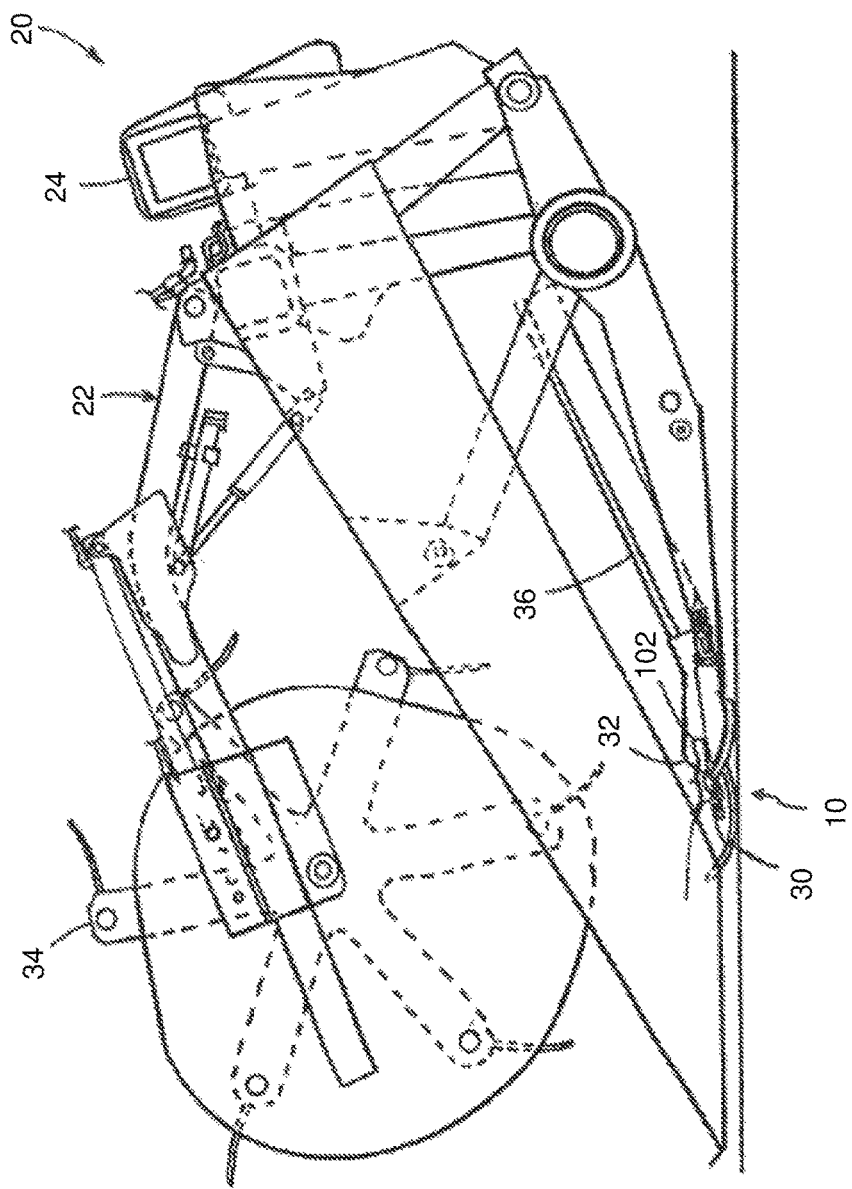
FIG. 2 is an enlarged left side elevation view of a header of the combine of FIG. 1.
Figure 3:
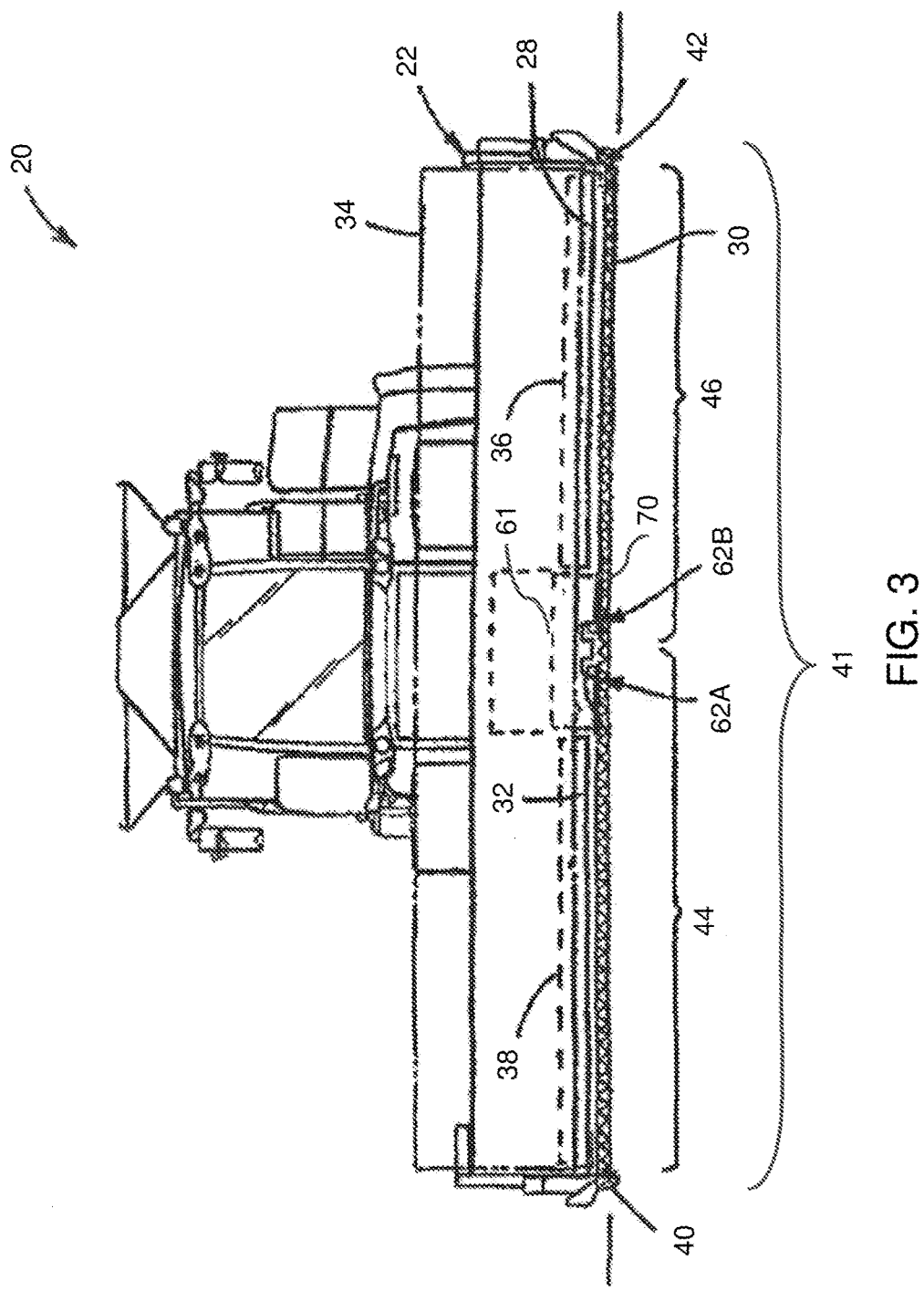
FIG. 3 is a front elevation view of the combine having the cutter guard assembly of FIG. 1.

Referring now to FIGS. 1-3 there is shown a preferred embodiment of a cutter guard assembly 10 for a knife drive of an agricultural farm implement e.g., a combine. For purposes of illustrating the present embodiment and not by way of limitation, the cutter guard assembly 10 will be described in connection with an agricultural combine 20 having a header 22. The cutter guard assembly 10 includes a cutter bar assembly 41, a window frame 70 and a floor or floor sheet 28.

The header 22 is shown supported on a forward end 24 of the combine 20, and is operable for cutting or severing crops such as, but not limited to, small grains such as wheat and soybeans, and inducting the severed crops into a feeder 26 for conveyance into the combine 20 for threshing and cleaning, as the combine 20 moves forwardly over a field.

The header 22 includes a pan or floor sheet 28 which is supported in desired proximity to the surface of the field during the harvesting operation, and an elongate, sidewardly extending sickle 30 along a forward edge portion 32 of floor sheet 28, sickle 30 being operable for severing the plants or crop for induction into header 22. Header 22 additionally includes an elongate, sidewardly extending reel 34 disposed above sickle 30 and rotatable in a direction for facilitating induction of the severed plant material or crop into header 22. Here, header 22 is configured as a draper type, having a system of elongate, flat, sidewardly moving draper belts 36 and 38 having upwardly facing surfaces disposed just rearwardly of forward edge portion 32, operable in cooperation with reel 34 for conveying the severed plant material or crops toward an inlet opening of feeder 26 for induction into combine 20.

Figure 4:
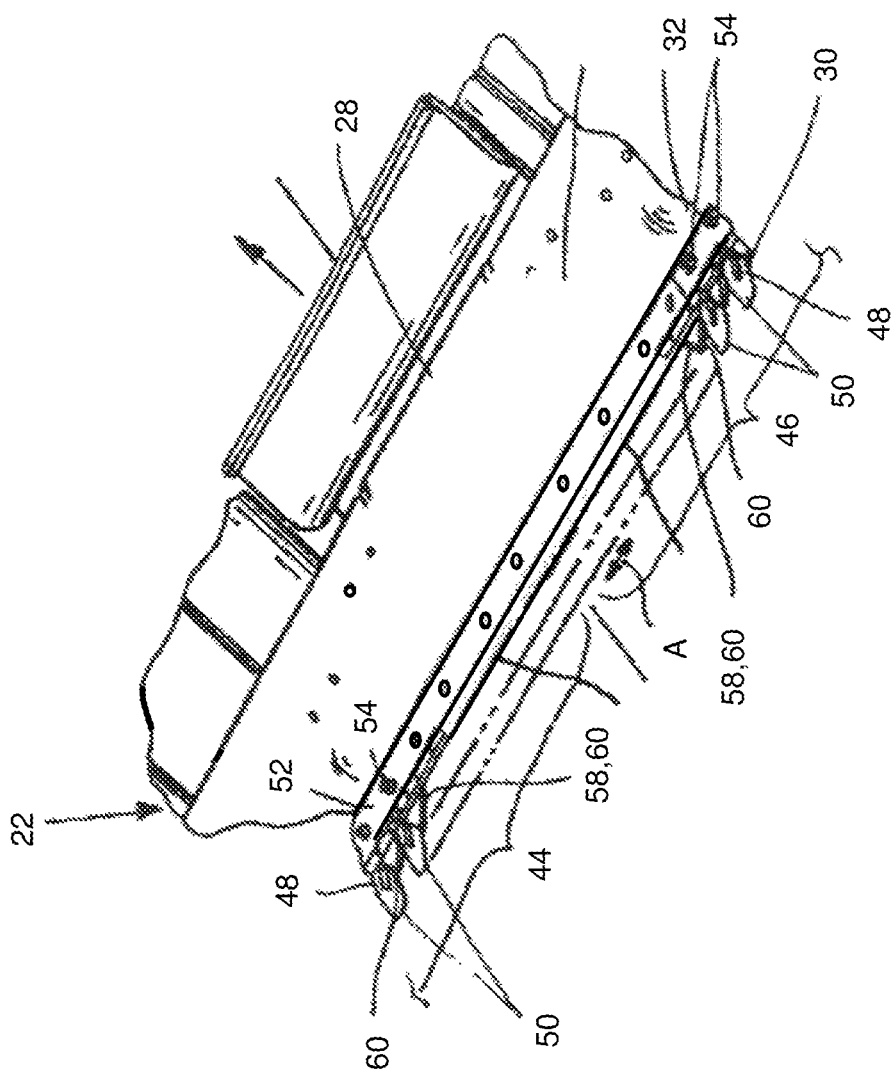
FIG. 4 is a partial perspective view of the cutter guard assembly of FIG. 1.
Figure 6:
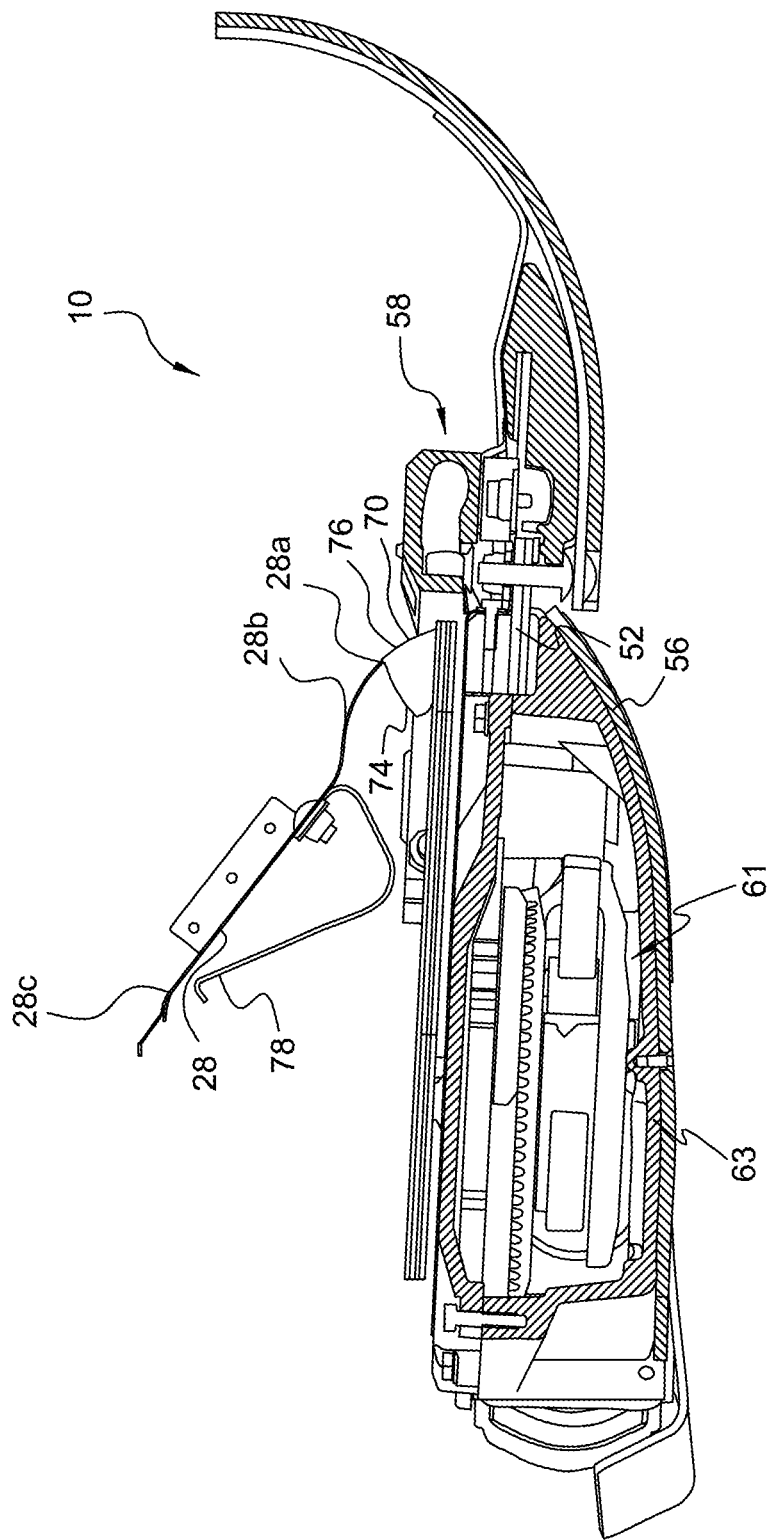
FIG. 6 is a right side cross-sectional view of the cutter guard assembly of FIG. 1 in a down position.

Referring more particularly to FIG. 3, sickle 30 extends in a sideward direction along the width of floor sheet 28, between a first side edge portion 40 of the floor, and an opposite second side edge portion 42. Sickle 30 includes an elongate, sidewardly extending cutter bar assembly 41 that includes a first cutter bar assembly 44, and an elongate, sidewardly extending second cutter bar assembly 46 extending in end to end relation to cutter bar assembly 44. The cutter bar assembly 41 is supported in substantially longitudinally aligned relation adjacent to the forward edge portion 32 of the floor 28. The cutter bar assembly 41 includes a cutter bar 52 (FIG. 4) and a reciprocating knife assembly 58 (FIG. 4), which is operatively connected to a knife drive 61 (FIG. 6). Further details regarding the general structure and operation of the header is disclosed in International Publication No. WO 2012/174530, the entire disclosure of which is incorporated by reference herein. Additional knife drives applicable to the present invention are disclosed in International Publication Nos. WO 2012/166672 and WO 2012/166674, the entire disclosures of which are incorporated by reference herein.

Referring to FIGS. 3-6, the cutter bar assemblies 44 and 46 each include a plurality of sidewardly facing aligned slots 48 through a sidewardly extending array of guards 50 which project forwardly from stationary bar or cutter bar 52 at sidewardly spaced intervals therealong. Cutter bar 52 extends the length of sickle 30 just forwardly of forward edge portion 32 of floor 28, and guards 50 are mounted to cutter bar 52 with fasteners 54. Cutter bar 52, in turn, is mounted to a frame 56 of the header 22 adjacent to forward edge portion 32 by fasteners. Each of the cutter bar assemblies 44 and 46 support an elongate reciprocating knife assembly 58 for reciprocating longitudinal movement within slots 48, each knife assembly 58 having a row of knife sections 60 including oppositely facing, angularly related knife edges which, in conjunction with adjacent guards 50, effects a shearing or cutting action which severs plant stems and stalks or other material captured between the knives and the guards as the knife sections are reciprocatively moved sidewardly.

Figure 5:
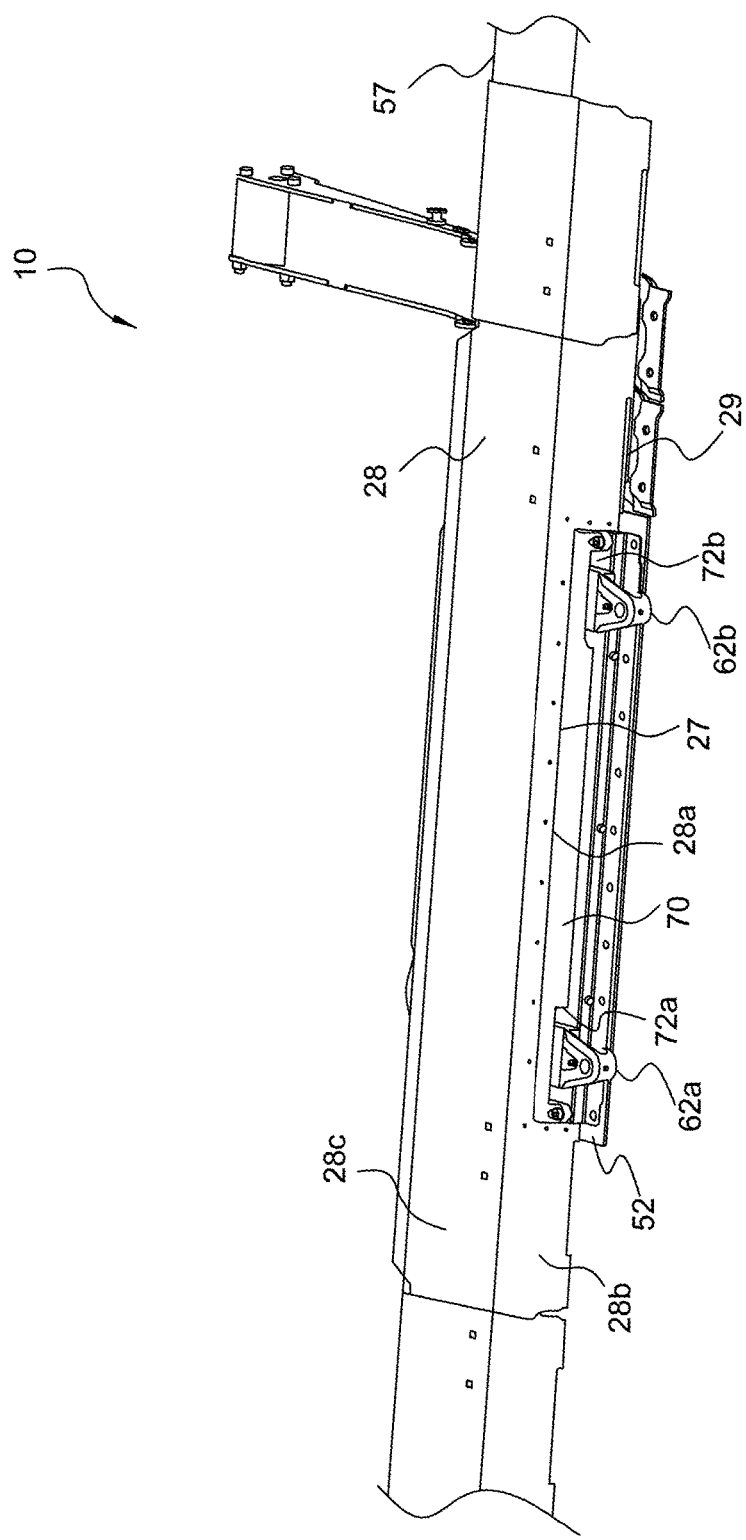
FIG. 5 is a partial front perspective view of the cutter guard assembly of FIG. 1.

The knife assembly 58 is reciprocatively driven by two knife arms e.g., first and second knife arms 62a and 62b of center knife drive 61. The knife arms 62a and 62b are best illustrated in FIGS. 3 and 5 at a center location on the header 22 equidistant between side edge portions 40 and 42 at the opposite ends of the header, although it should be noted that it is contemplated that the center knife drive 61 could alternatively be utilized at other locations on a header and that multiple drives could be used at multiple locations on a header. Center knife drive 61 is preferably located completely within or beneath floor sheet 28, to reduce interruption of flow of cut plant material thereover and thereabout. Center knife drive 61 can include a variety of vertically compact mechanisms to facilitate the location in or under floor 28, such as, but not limited to, low profile or compact epicyclical, crank, and pivoting type apparatus operable to impart a reciprocating sideward motion, or pivoting sideward motion, to the knife assemblies.

Referring to FIGS. 5 and 6, the window frame 70 is configured as shown and rigidly attached to the cutter bar 52 so as to be stationary with the cutter bar 52. That is, when the cutter bar 52 flexes or pivots relative to a header frame of the header (commonly known as a Z-channel 57), the window frame 70 moves coincidentally with the cutter bar 52. The window frame 70 is an elongated frame that extends in a widthwise direction about a front end of the floor sheet 28. The window frame 70 includes a cutout or opening 72*a* about its anterior end for the passage of a knife arm therethrough. Preferably, the window frame 70 includes two spaced apart openings 72*a* and 72*b* for respectively receiving one of the first and second knife arms 62*a*, 62*b*.

The window frame 70 also includes a convex curved posterior end 74, as best shown in cross-section in FIG. 6. FIG. 6 illustrates a longitudinal cross-section of the window frame 70. The anterior end 76 of the window frame 70 is also a curved end. The posterior end 74 extends from the anterior end 76 and has an arc defined by a radius from an axis (not shown) about which the floor sheet 28 pivots at its point of attachment (see FIG. 5) to the cutter bar 52 to an anterior-most end 28*a* of the floor sheet 28 positioned adjacent the convex curved posterior end 74. Thus, the posterior end 74 slidingly engages or is minimally spaced apart from the anterior-most end 28*a* of the floor sheet 28 positioned adjacent the convex curved posterior end 74. Consequently, in operation, as the cutter bar assembly 41 pivots or flexes, waste material is prevented from depositing on top of the center knife drive 61 from between the floor sheet 28 and window frame 70 as a result of the posterior end 74 being contoured to match the arc path of the anterior-most end of the floor sheet 28*a* as it pivots relative to the window frame 70. The anterior most end 28*a* of the floor sheet 28 is adjacent the convex posterior end 74 of the window frame 70.

The floor sheet 28 is configured as best shown in FIGS. 5 and 6. The floor sheet 28 includes a curved anterior portion 28*b* and a substantially planar portion 28*c* extending from the curved anterior portion 28*b*. The floor sheet 28 is attached to the cutter bar 52 at its front end or anterior end 29 e.g., by a pivot mechanism or hinge. The floor sheet 28 extends rearwardly from the cutter bar 52 so as to substantially cover the knife drive 61. As shown in FIG. 6, the floor sheet 28 includes a spring 78 mounted to an underside of the floor sheet 28. The floor sheet 28 is mounted to the cutter bar assembly 41 such that the spring 78 biases against the Z-channel frame 57 of the header 22.

The floor sheet 28 includes an opening 27 about its anterior end for the passage of the window frame 70 therethrough. The anterior most end 28*a* of the floor sheet 28 is the most anterior end portion of the floor sheet 28 forming the lengthwise portion of the opening 27. Preferably, the opening 27 is configured as a horizontal slot.

Figure 7:
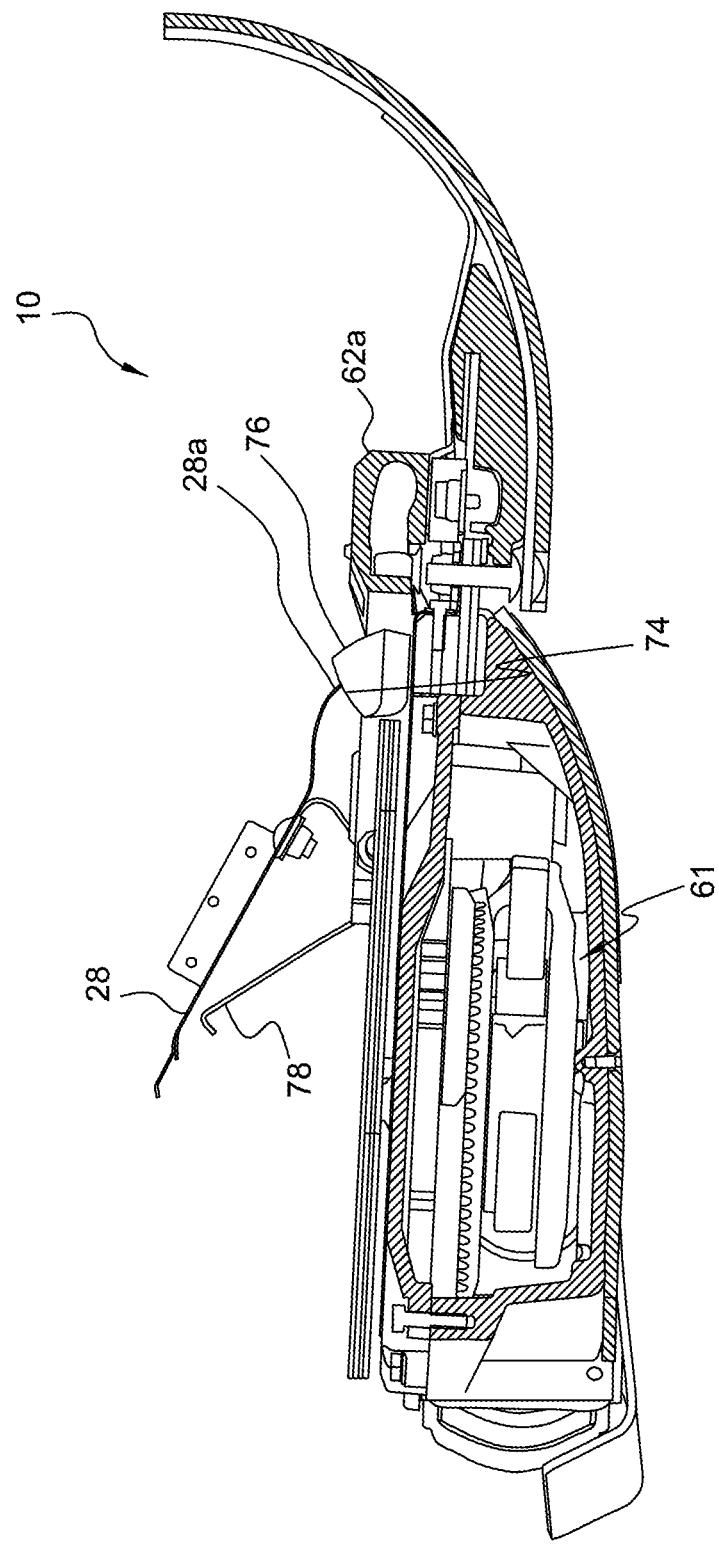
FIG. 7 is a right side cross-sectional view of the cutter guard assembly of FIG. 1 in an intermediate position.
Figure 8:
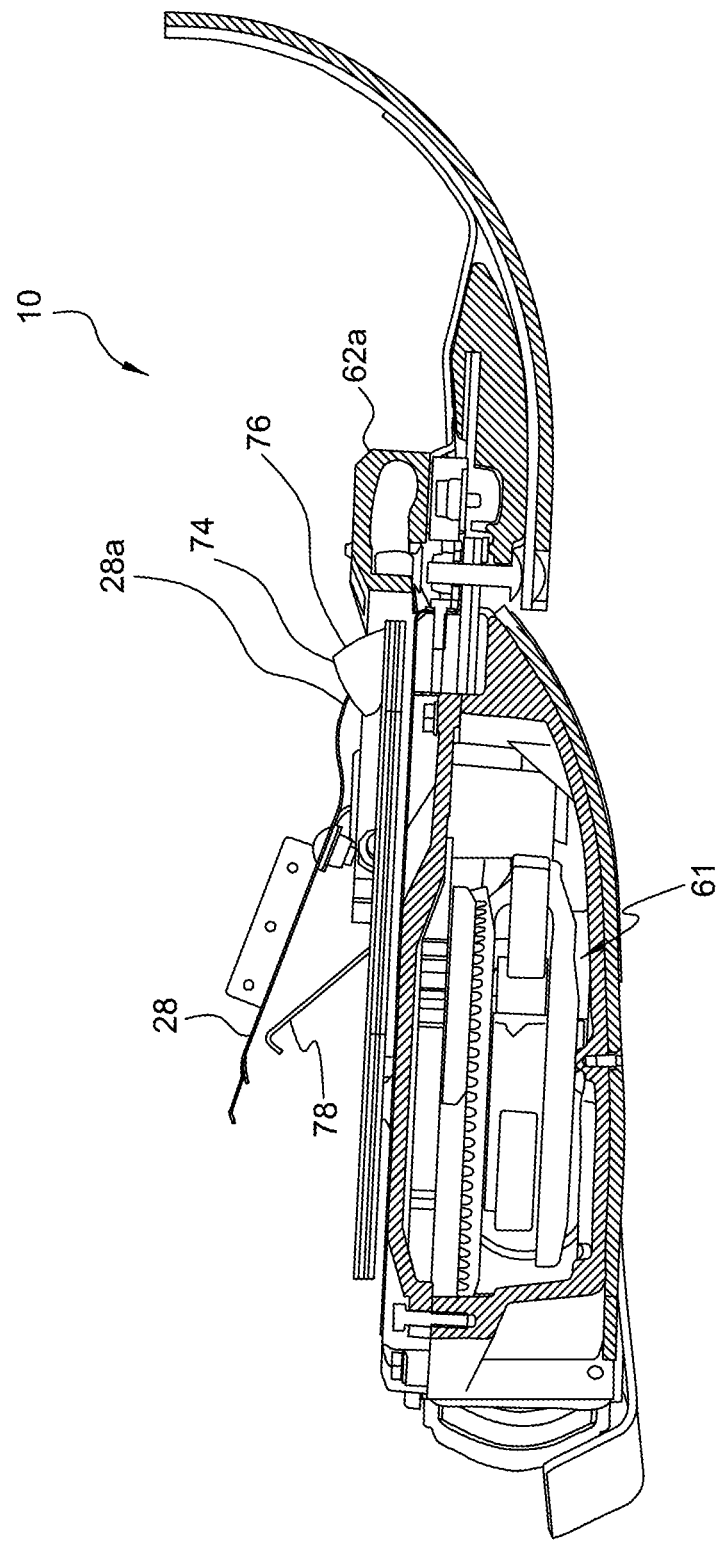
FIG. 8 is a right side cross-sectional view of the cutter guard assembly of FIG. 1 in an up position.

The floor sheet 28 is configured to move relative to the frame (such as the Z-channel 57) of the header 22 when the knife drive 61 pivots about its pivot axis. As such, the floor sheet 28 pivots relative to the cutter bar assembly about its point of attachment to the cutter bar 52 and relative to the window frame 70 as the floor sheet 28 slides along the Z-channel when the knife drive 61 pivots. The pivoting movement of the cutter bar assembly 41 is illustrated in FIGS. 6-8. FIG. 6 illustrates the cutter bar assembly 41 in a down position, while FIG. 7 illustrates the cutter bar assembly 41 in an intermediate position. FIG. 8 represents the cutter bar assembly 41 in an up position. Collectively, FIGS. 6-8 illustrate the cutter bar assembly 41 and floor sheet 28 flexing or pivoting about a central axis (not shown) positioned rearwardly of the cutter bar assembly 41 from a down position to an up position as the floor sheet 28 remains in contact with the Z-channel or slides along the Z-channel 57.

Referring to FIGS. 9-15, in accordance with another preferred embodiment the present invention provides a cutter guard assembly 110 for a knife drive 161 of an agricultural combine that includes a cutter bar assembly 141, a window frame 170, and a flap 180*a*. The cutter guard assembly 110 is configured and operates substantially as described above for cutter guard assembly 10, except for the features described hereinafter.

Figure 12:
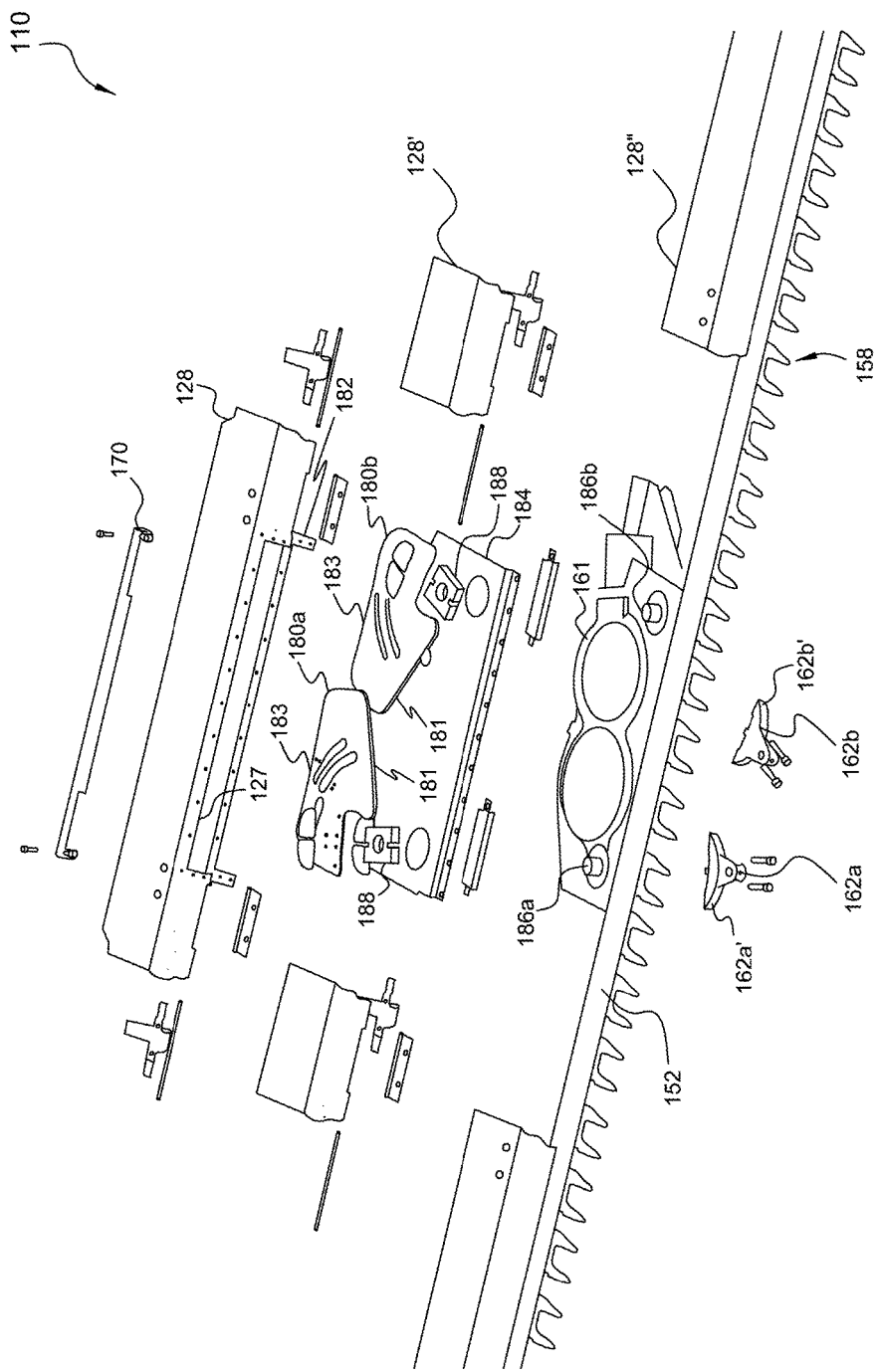
FIG. 12 is an exploded perspective view of the cutter guard assembly of FIG. 9.

FIGS. 9-12 illustrate the cutter guard assembly 110 in an assembled state but without any sickles or knives attached to the cutter bar 152. FIG. 12 illustrates the cutter guard assembly 110 in an exploded perspective view. The cutter guard assembly 110 can include a window frame 170, a floor sheet 128, a center knife drive 161, a cutter bar 152, and a gearbox cover plate 184. The cutter guard assembly can optionally include a seal 182 positioned between the floor 128 and the window frame 170.

The center knife drive 161 includes a gearbox 163 having a pair of shafts 186*a*, 186*b* extending therefrom for operatively engaging first and second knife arms 162*a*, 162*b*. Each of the first and second knife arms 162*a*, 162*b* are connected to their respective shafts 186*a*, 186*b*. For example, the knife arms can be connected to their respective shafts by a separate spline block 188. Each spline block 188 is keyed to connect with an individual knife arm.

The gearbox cover plate 184 has a pair of openings for the passage of shafts 186*a*, 186*b* therethrough and is mounted on top of the center knife drive 161. The gearbox cover plate 184 is a substantially planar cover plate with the spline block 188 and flaps 180*a*, 180*b* situated on top of the cover plate 184. The gearbox cover plate 184 substantially covers the center knife drive 161, however, the gearbox cover plate 184 can also be sized and shaped so as not to substantially cover the center knife drive 161 e.g., it can be shorter in length than the center knife drive 161.

The cutter guard assembly 110 preferably includes a pair of flaps 180*a*, 180*b* pivotably mounted on top of the cover plate 184. Each flap is connected to a respective center knife drive shaft. The center knife drive shaft pivots to drive a respective flap towards and away from a slot 171 formed in the window frame 170. In particular, each flap has and L-shaped cutout for mounting adjacent a spline block 188 such that the spline block 188 engages the flap to pivot the flap about a respective gearbox shaft.

Referring back to FIGS. 9 and 11, the cutter guard assembly 110 includes a cutter bar assembly 141 that includes a cutter bar 152 and a reciprocating knife assembly 158 operatively connected to the knife drive 161. The reciprocating knife assembly 158 is configured and operates as discussed above for reciprocating knife assembly 58.

Figure 9:
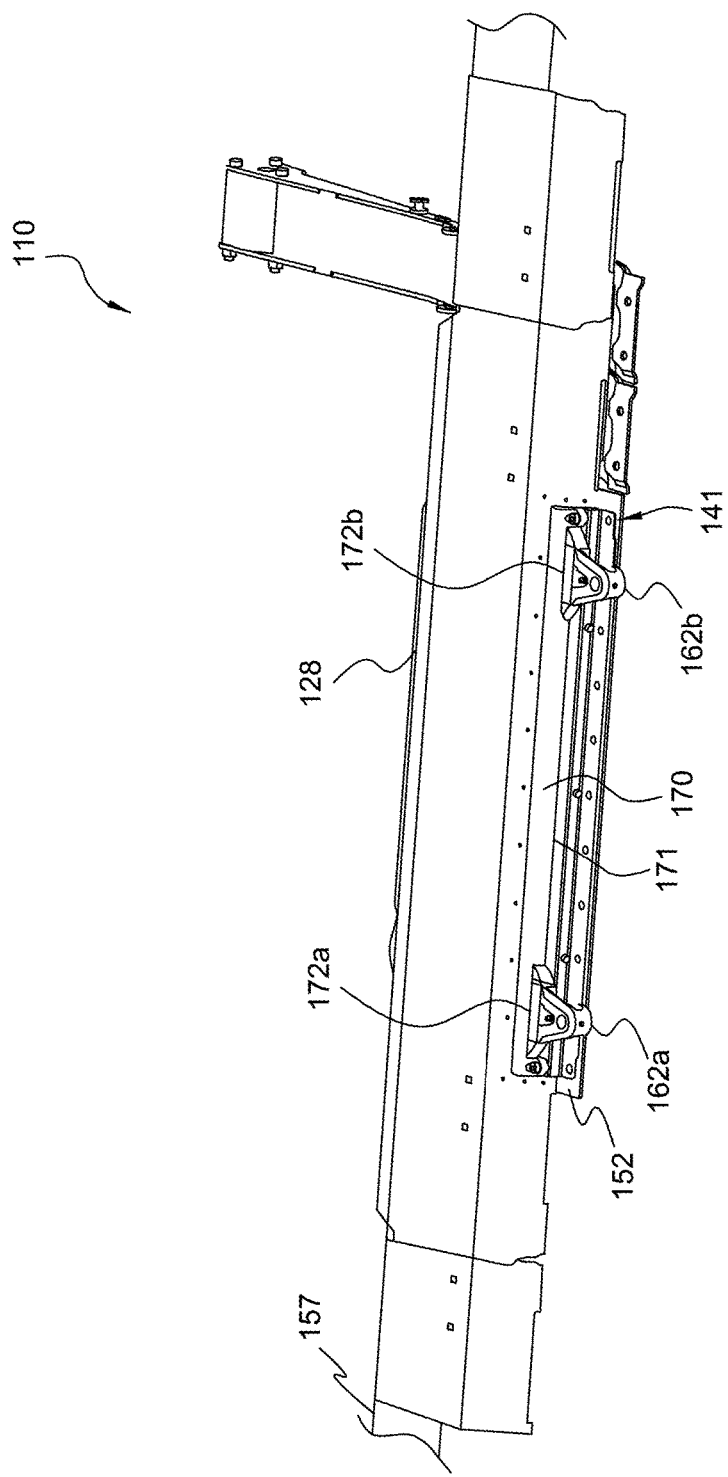
FIG. 9 is a partial front perspective view of a cutter guard assembly in accordance with another preferred embodiment of the present invention.
Figure 10:
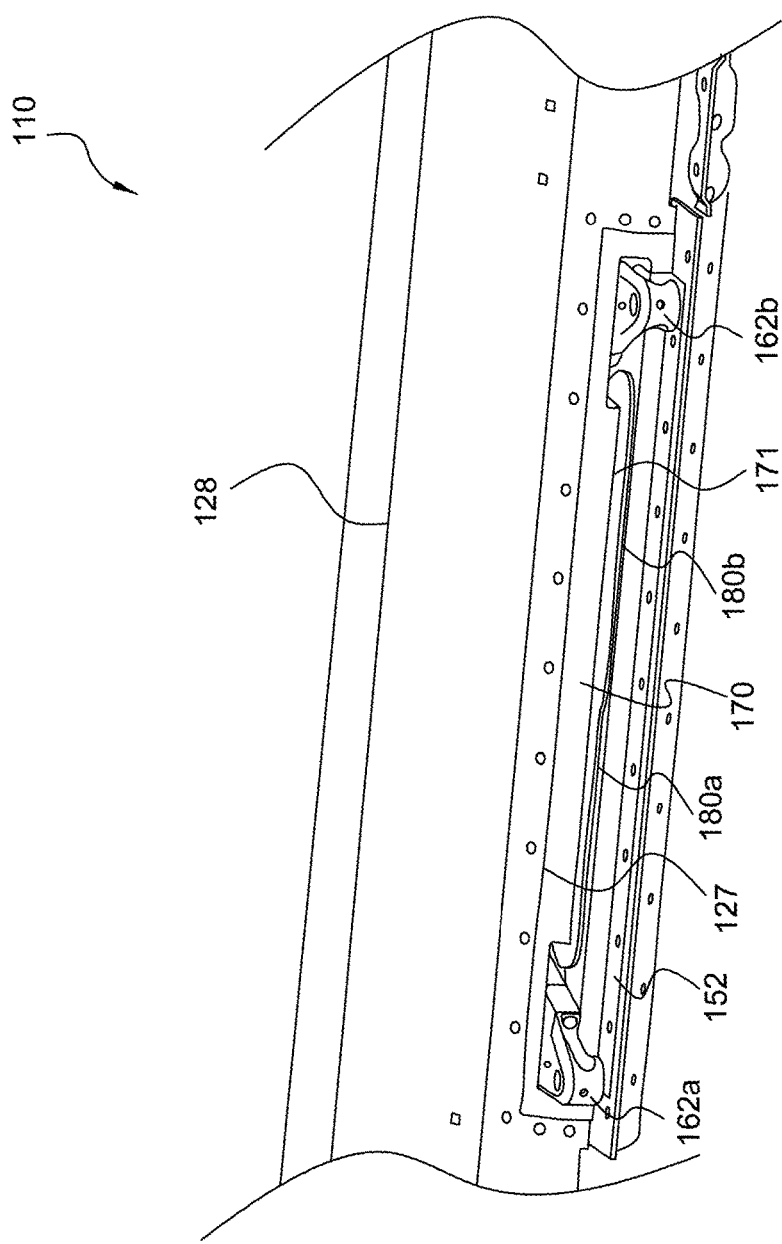
FIG. 10 is an enlarged front partial perspective view of the cutter guard assembly of FIG. 9 with flaps positioned within a slot of a window frame.
Figure 11:
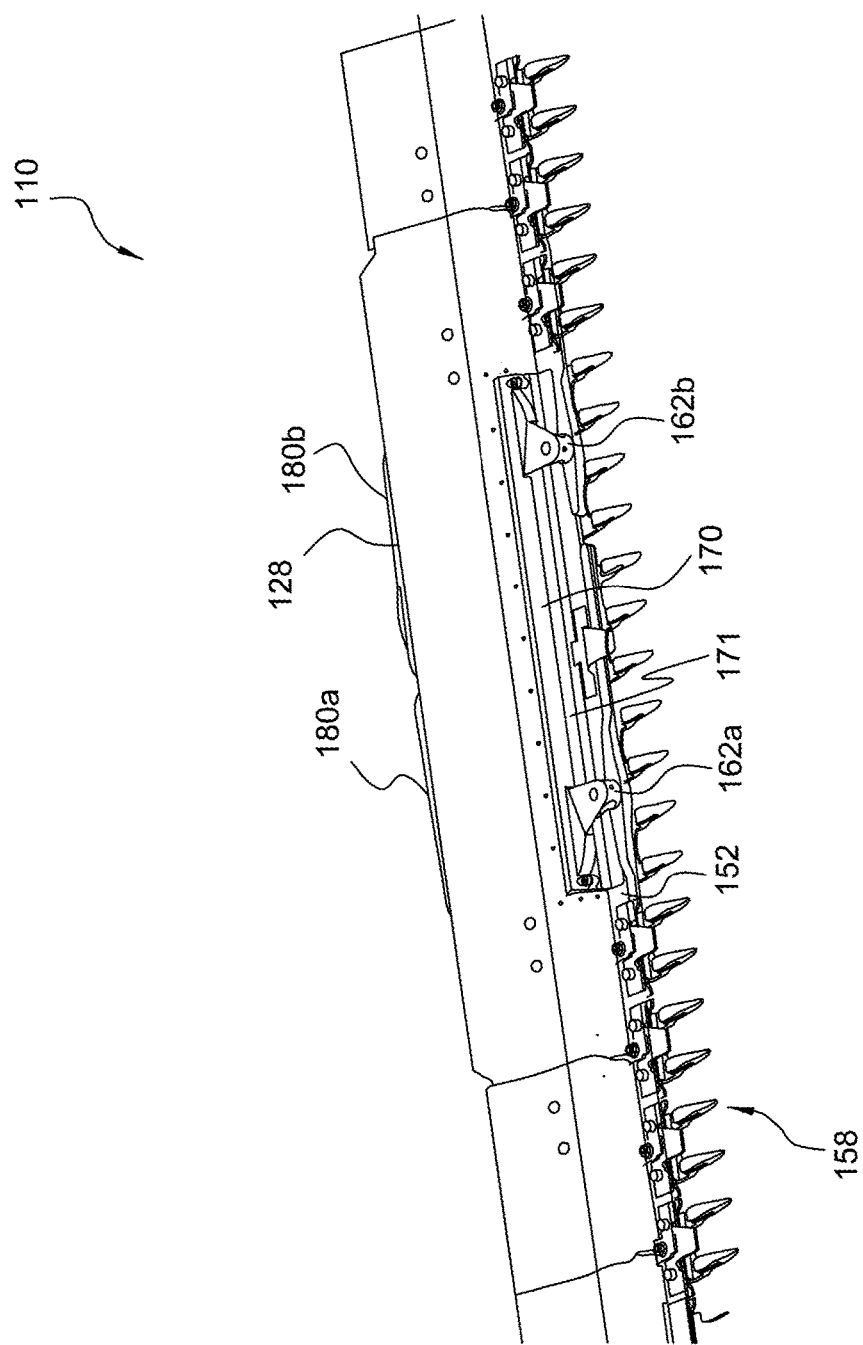
FIG. 11 is another enlarged front perspective view of the cutter guard assembly of FIG. 9.

The window frame 170 is configured as best shown in FIGS. 10 and 12. The window frame 170 is an elongated frame having openings 172*a*, 172*b* for the passage of respective knife arms 162*a*, 162*b* therethrough. That is, the reciprocating knife assembly 158 includes two knife arms 162*a*, 162*b* and the window frame 170 includes two openings 172*a*, 172*b* for respectively receiving one of the two knife arms therethrough. The window frame 170 is rigidly mounted to the cutter bar 152 as best shown in FIG. 9. Preferably, the window frame 170 is attached to the cutter bar 152 by fasteners about opposite ends of the window frame 170.

Figure 13:
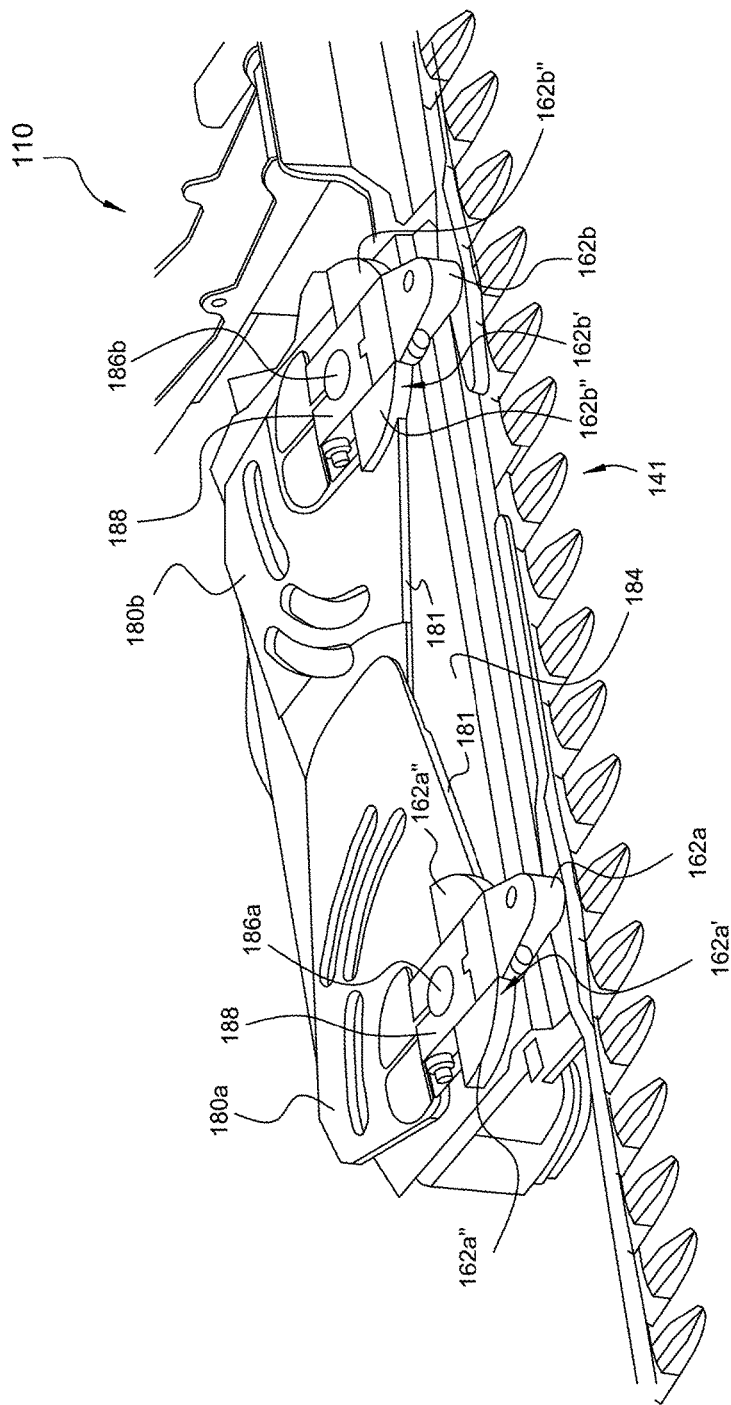
FIG. 13 is a partial top perspective view of the cutter guard assembly of FIG. 12 in an assembled state, but with certain features omitted.

Referring to FIGS. 9, 12 and 13, each knife arm 162*a*, 162*b* is configured to have an arch-shaped turret assembly 162*a*', 162*b*'. That is, the forwardly facing surface of the knife arm turret is convexly curved or arched and an anterior end of the knife arm extends forwardly of the arch-shaped turret. The arch-shaped turrets maintain a blocking surface within the window frame openings 172*a*, 172*b* (sees FIGS. 9 and 11) so as to maintain a closed surface or closed face and prevent the inward flow of crop residue within the internal regions of the cutter guard assembly during operation. In other words, the arch-shaped turret assembly includes a pair of knife arm turrets 162*a*" (or 162*b*") affixed to opposing sides of the knife arm such that a closed surface is maintained during oscillating movement of the knife arm during operation in the front of the floor sheet of the header during operation and inward flow of crop material.

The window frame slot 171 extends from openings 172*a* and 172*b*. Further, when the window frame 170 is mounted to the cutter bar 152, the anterior front end of the window frame is spaced apart from a top surface of the cutter bar 152 thereby forming slot 171. The slot 171 is a substantially horizontal slot. Preferably, the slot 171 is sized and shaped to receive each of the flaps 180*a*, 180*b* therethrough. More preferably, the slot 171 is complementarily sized and shaped to allow the passage of flaps 180*a*, 180*b* therethrough. As such, the flaps 180*a*, 180*b* obstruct a flow, such as a flow of debris, through the slot 171 when the flaps 180*a*, 180*b* are positioned within the slot 171. In other words, when the flaps 180*a*, 180*b* are moved through the slot 171, the flaps 180*a*, 180*b* are minimally spaced from the edges of the slot 171 or slidingly engages the edges of the slot 171.

Figure 14:
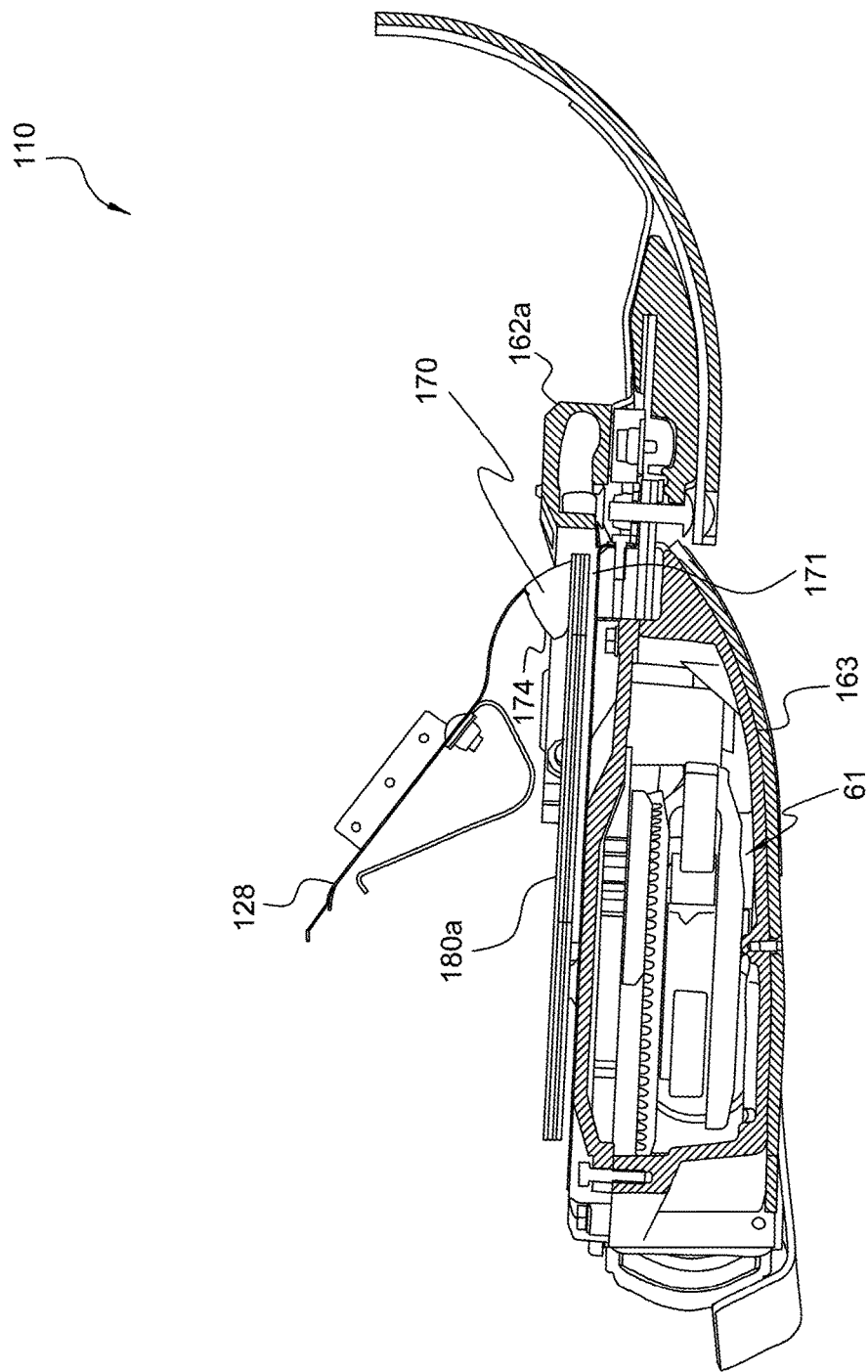
FIG. 14 is a right side cross-sectional view of the cutter guard assembly of FIG. 9 with a flap positioned within a slot of a window frame.
Figure 15:
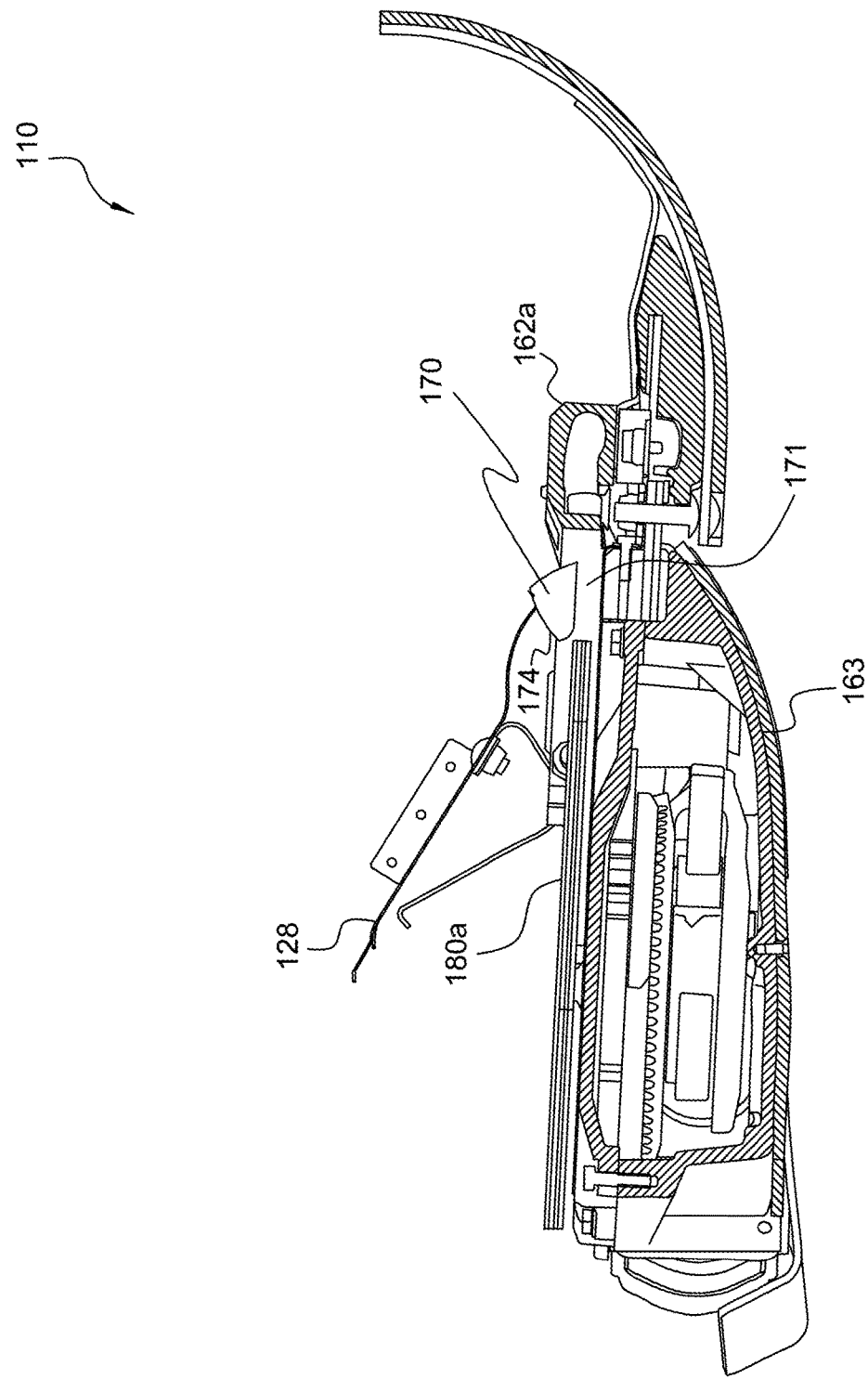
FIG. 15 is a right side cross-sectional view of the cutter guard assembly of FIG. 9 with a flap withdrawn from a slot of a window frame.

The pair of flaps 180*a*, 180*b* is operatively connected to the knife drive 161 for reciprocatively moving towards and away from the slot 171. Each flap is configured as best shown in FIG. 12 as a planar flap having a front edge 181 and a rear edge 183. Each flap is also shaped as a trapezoid having an L-shaped cutout about a base of the trapezoid for attaching adjacent to a respective spline block 188. Preferably, the flaps 180*a*, 180*b* are operatively connected to the knife drive 161 for moving in and out of the slot 171. That is, as the flaps 180*a*, 180*b* pivot, the front edge 181 of each flap moves in and out of the slot 171. Since the flaps 180*a*, 180*b* are operatively connected to the shafts of the center knife drive 161, the flaps 180*a*, 180*b* pivot coincidently with the knife arms of the reciprocating knife assembly 158. FIG. 14 illustrates flap 180*a* positioned within the slot 171, while FIG. 15 illustrates the flap 180*a* pivoted away from and out of the slot 171. Thus, in operation, the pivoting movement of the flaps 180*a*, 180*b* function as a self-cleaning mechanism to remove debris and waste material that enters through the slot 171.

Similar to cutter guard assembly 10, the cutter guard assembly 110 further comprises a floor sheet 128 extending rearwardly from the cutter bar 152 that is pivotable relative to the window frame 170. The floor sheet 128 also pivots relative to the cutter bar assembly 141 and the window frame 170. The floor sheet 128 includes an opening 127 about its anterior end for the passage of the window frame 170 therethrough. The floor sheet 128 can move along the Z-channel 157 as the knife drive 161 pivots or flexes relative to the Z-channel of the header and pivots relative to the window frame 170.

Similar to window frame 70 described above, window frame 170 includes a convex curved posterior end 174. The convex curved posterior end 174 has an arc shape substantially defined by a radius from an axis (not shown) about which the floor sheet 128 pivots about its point of attachment to the cutter guard 152 to an anterior-most end of the floor sheet 128 adjacent the convex curved posterior end.

It will be appreciated by those skilled in the art that changes could be made to the embodiments described above without departing from the broad inventive concept thereof. It is to be understood, therefore, that this invention is not limited to the particular embodiments disclosed, but it is intended to cover modifications within the spirit and scope of the present invention as defined by the appended claims.

We claim:

1. A cutter guard assembly for a knife drive of an agricultural farm implement comprising:
   a cutter bar assembly that includes a cutter bar and a reciprocating knife assembly operatively connected to a knife drive,
   a window frame rigidly attached to the cutter bar, the window frame comprising a convex curved posterior end,
   a knife arm of the reciprocating knife assembly extending through an opening of the window frame, and
   a floor sheet extending rearwardly from the cutter bar and pivotable relative to the window frame.

2. The cutter guard assembly of claim 1, wherein the floor sheet includes an opening about an anterior end for the passage of the window frame therethrough.

3. The cutter guard assembly according to claim 1, wherein the floor sheet pivots relative to the cutter bar assembly and the window frame.

4. The cutter guard assembly according to claim 1, wherein the reciprocating knife assembly includes two knife arms and the window frame includes two openings, each for respectively receiving one of the two knife arms therethrough.

5. The cutter guard assembly according to claim 1, wherein the knife arm includes an arch-shaped turret assembly.

6. The cutter guard assembly according to claim 1, wherein the knife arm includes a pair of knife arm turrets affixed to opposing sides of the knife arm such that a closed surface is maintained during oscillating movement of the knife arm during operation in the front of the floor sheet during operation and inward flow of crop material.

7. A cutter guard assembly for a knife drive of an agricultural farm implement comprising:
   a cutter bar assembly that includes a cutter bar and a reciprocating knife assembly operatively connected to a knife drive,
   a window frame rigidly attached to the cutter bar, the window frame comprising a convex curved posterior end,
   a knife arm of the reciprocating knife assembly extending through an opening of the window frame, and
   a floor sheet extending rearwardly from the cutter bar and pivotable relative to the window frame,
   wherein the convex curved posterior end has an arc defined by a radius from an axis about which the floor sheet pivots at its point of attachment to the cutter bar to an anterior-most end of the floor sheet adjacent the convex curved posterior end.

8. The cutter guard assembly of claim 7, wherein the floor sheet includes an opening about an anterior end for the passage of the window frame therethrough.

9. The cutter guard assembly according to claim 7, wherein the floor sheet pivots relative to the cutter bar assembly and the window frame.

10. The cutter guard assembly according to claim 7, wherein the reciprocating knife assembly includes two knife arms and the window frame includes two openings, each for respectively receiving one of the two knife arms therethrough.

11. The cutter guard assembly according to claim 7, wherein the knife arm includes an arch-shaped turret assembly.

12. The cutter guard assembly according to claim 7, wherein the knife arm includes a pair of knife arm turrets affixed to opposing sides of the knife arm such that a closed surface is maintained during oscillating movement of the knife arm during operation in the front of the floor sheet during operation and inward flow of crop material.

* * * * *